Aug. 5, 1958  L. H. SMITH, JR  2,846,137
CONSTRUCTION FOR AXIAL-FLOW TURBOMACHINERY
Filed June 3, 1955

INVENTOR.
LEROY H. SMITH, JR.
BY
Edward M. Tritle
HIS ATTORNEY

United States Patent Office 2,846,137
Patented Aug. 5, 1958

2,846,137

CONSTRUCTION FOR AXIAL-FLOW TURBOMACHINERY

Leroy Harrington Smith, Jr., Cincinnati, Ohio, assignor to General Electric Company, a corporation of New York Application June 3, 1955, Serial No. 512,935

3 Claims. (Cl. 230—122)

The present invention relates to an improved construction for axial-flow turbomachinery and, more particularly, to such a construction in which the inner and outer casings of the turbomachine are provided with undulations to improve the flow therethrough.

In conventional axial-flow compressors, the greatest blade losses due to meridional diffusion and Mach number occur at the outer casing for the rotor blades and at the inner casing for the stator blades. These losses result in decreased efficiency of flow through the rotor and stator blade rows. The present invention materially decreases these losses by shaping the inner and outer casings to improve the flow through the rotor and stator blade rows. This is accomplished by providing alternate concave and convex sections in the inner and/or outer casings so that the velocity of flow is decreased at the leading edges of the rotor and stator blades at the outer and inner casings respectively, and increased at the trailing edges thereof.

An object of the present invention is to provide improved flow through the rotor and stator blade rows of axial-flow turbomachinery.

Another object is to materially decrease the blade losses in axial-flow turbomachinery due to meridional diffusion and Mach number.

Figure 1:
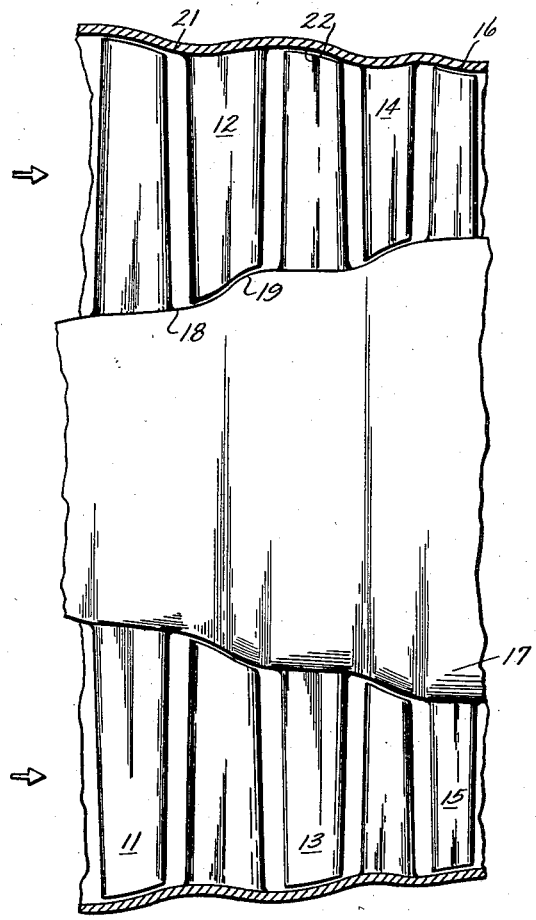
Figure 2:
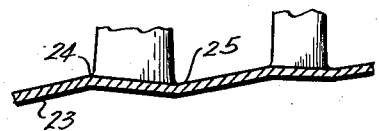

Other objects and many of the attendant advantages of this invention will be readily appreciated as the same becomes better understood by reference to the following detailed description when considered in connection with the accompanying drawing wherein:

Fig. 1 is a fragmentary elevation view of an axial-flow compressor showing a desired embodiment of the present invention; and Fig. 2 is a fragmentary cross-sectional view of the outer casing of a compressor showing a further embodiment of the invention.

Referring more particularly to Fig. 1 of the drawing, the compressor illustrated comprises in essence a plurality of spaced rows of rotor blades 11, 13 and 15 attached at their roots to the inner casing 17 which defines the inner flow boundary, and a plurality of rows of stator blades 12 and 14 extending between adjacent rows of rotor blades, the stator blades being secured at their roots to the outer casing 16 which defines the outer flow boundary. The inner casing 17 is provided with alternate concave and convex curves 18 and 19 respectively, the concave curves 18 occurring at the trailing edges of the rotor blades and leading edges of the stator blades, and the convex curves 19 occurring at the trailing edges of the stator blades and the leading edges of the rotor blades. The outer casing 16 is similarly provided with convex curves 21 occurring at the trailing edges of the rotor blades and the leading edges of the stator blades, and concave curves 22 occurring at the trailing edges of the stator blades and leading edges of the rotor blades.

In the embodiment illustrated in Fig. 2, the undulations in the casing 23 are not smooth curves, but instead have a saw-tooth-like configuration. In this embodiment the convex and concave sections, 24 and 25, respectively, are formed of line segments joined by corners rather than of interconnected arcs. This construction is applicable to both the inner and outer casings and has the advantage of ease of manufacture since it is easier to machine a series of lines than a series of arcs.

In operation, the air flowing through the blade rows, in the direction of the arrows, moves at reduced velocities in the areas of the concave sections and at increased velocities in the areas of convex sections. The velocities of flow at the inner flow boundary are thus increased across the widths of the stator blades such that the exit velocities at the trailing edges are greater than the inlet velocities at the leading edges of the blades. At the outer flow boundary the velocities of flow are similarly increased across the widths of the rotor blades. This difference in velocity of flow between the leading and trailing edges of the blades reduces the amount of meridional diffusion and decreases the inlet relative Mach number losses.

As illustrated, both the inner and outer casings are provided with undulations but it is contemplated that in some instances it may be desirable to provide undulations in only one of the casings. In addition, it is contemplated that the undulations may be formed adjacent only certain of the blade rows instead of over the entire length of the compressor.

While the invention is illustrated and described as applied to an axial-flow compressor, it is understood that the same principles are applicable to a turbine.

Obviously, many modifications and variations of the present invention are possible in the light of the above teachings. It is, therefore, to be understood that within the scope of the appended claims, the invention may be practiced otherwise than as specifically described.

What is claimed is:

1. In an axial-flow turbomachine including undulant inner and outer casings defining the boundaries of a path for working fluid, and rotor and stator blades having tips and root sections, the rotor and stator blades being mounted in alternate rows on the inner and outer casings respectively; means for increasing the velocity of flow of the working fluid across the tips of the rotor and stator blades, including convex sections of the outer casing extending upstream of the trailing edges of the tips of at least some of the rows of rotor blades and downstream of the leading edges of the roots of the adjacent rows of stator blades, and convex sections of the inner casings extending upstream of the trailing edges of the tips of at least some of the rows of stator blades and downstream of the leading edges of the roots of the adjacent rows of rotor blades; and means for decreasing the velocity of flow of the working fluid across the roots of the rotor and stator blades, including concave sections of the outer casing extending upstream of the trailing edges of the roots of at least some of the rows of stator blades and downstream of the leading edges of the tips of the adjacent rows of rotor blades, and concave sections of the inner casing extending upstream of the trailing edges of the roots of at least some of the rows of rotor blades and downstream of the leading edges of the tips of the adjacent rows of stator blades.

2. In an axial-flow turbomachine including undulant inner and outer casings defining the boundaries of a gas path, and rotor and stator blades having tips and root sections, the rotor and stator blades being mounted in alternate rows on the inner and outer casings respectively; means for increasing the velocity of flow of the working gases across the tips of the rotor and stator blades, including convex curves in the outer casing extending upstream of the trailing edges of the tips of at least some of the rows of rotor blades and downstream of the leading edges of the roots of the adjacent rows of stator blades, and convex curves in the inner casing extending upstream of the trailing edges of the tips of at least some of the rows of stator blades and downstream of the leading edges of the roots of the adjacent rows of rotor blades; and means for decreasing the velocity of flow of the working gases across the roots of the rotor and stator blades, including concave curves in the outer casing extending upstream of the trailing edges of the roots of at least some of the rows of stator blades and downstream of the leading edges of the tips of the adjacent rows of rotor blades, and concave curves in the inner casings extending upstream of the trailing edges of the roots of at least some of the rows of rotor blades and downstream of the leading edges of the tips of the adjacent rows of stator blades.

3. In an axial-flow turbomachine including undulant inner and outer casings defining the boundaries of a gas path, and rotor and stator blades having tips and root sections, the rotor and stator blades being mounted in alternate rows on the inner and outer casings respectively; means for increasing the velocity of flow of the working gases across the tips of the rotor and stator blades, including convex curves in the outer casing extending upstream of the trailing edges of the tips of each row of rotor blades and downstream of the leading edges of the roots of each adjacent row of stator blades, and convex curves in the inner casing extending upstream of the trailing edges of the tips of each row of stator blades and downstream of the leading edges of the roots of each adjacent row of rotor blades; and means for decreasing the velocity of flow of the working gases across the roots of the rotor and stator blades, including concave curves in the outer casing extending upstream of the trailing edges of the roots of each row of stator blades and downstream of the leading edges of the tips of each adjacent row of rotor blades, and concave curves in the inner casing extending upstream of the trailing edges of the roots of each row of rotor blades and downstream of the leading edges of the tips of each adjacent row of stator blades, the convex and concave curves in each casing intersecting approximately mid-way between the leading and trailing edges of the rows of blades.

References Cited in the file of this patent

UNITED STATES PATENTS

| 2,623,357 | Birmann | Dec. 30, 1952 |

FOREIGN PATENTS

| 75,450 | Netherlands | Aug. 16, 1954 |
| 564,336 | Great Britain | Sept. 22, 1944 |
| 692,188 | Great Britain | June 3, 1953 |
| 823,441 | France | Oct. 18, 1937 |
| 976,791 | France | Oct. 19, 1948 |
| 988,736 | France | May 9, 1951 |